United States Patent

Ooitsu et al.

[11] Patent Number: 6,116,393
[45] Date of Patent: Sep. 12, 2000

[54] PULLEY UNIT

[75] Inventors: Junya Ooitsu, Osaka; Yasuhito Tanaka, Nara; Hajime Tazumi; Yoshitaka Nakagawa, both of Osaka, all of Japan

[73] Assignee: Koyo Seiko Co., Ltd., Osaka, Japan

[21] Appl. No.: 09/158,984

[22] Filed: Sep. 23, 1998

[30] Foreign Application Priority Data

Sep. 25, 1997 [JP] Japan .................... P9-259684

[51] Int. Cl.⁷ .................................... F16D 41/06
[52] U.S. Cl. ................ 192/45; 192/41 R; 192/110 B
[58] Field of Search .................... 192/45, 41 R, 192/107 T, 110 B; 474/70

[56] References Cited

U.S. PATENT DOCUMENTS

| | | |
|---|---|---|
| 4,494,637 | 1/1985 | Gotoda et al. . |
| 5,307,911 | 5/1994 | Robinson . |
| 5,672,110 | 9/1997 | Kurita et al. ........................ 192/45 X |
| 5,675,202 | 10/1997 | Zenmei et al. ...................... 192/45 X |

FOREIGN PATENT DOCUMENTS

P7-317807  12/1995  Japan .
2 220 714  1/1990  United Kingdom .

*Primary Examiner*—Richard M. Lorence
*Attorney, Agent, or Firm*—Thelen Reid & Priest

[57] ABSTRACT

In an annular space between a pulley and a shaft body disposed coaxially with each other, a one-way clutch is interposed in an intermediate range in an axial direction and rolling bearings are disposed on both sides in the axial direction of the one-way clutch. A tightening distance for fitting between the one-way clutch and pulley is set to be smaller than that between the rolling bearing and pulley. Due to this structure, in a condition in which an excessive radial load acts upon the pulley, that radial load acts on not the one-way clutch but the rolling bearings on both sides thereof, so that a clutch operation of the one-way clutch can be carried out stably.

7 Claims, 6 Drawing Sheets

PULLEY UNIT

BACKGROUND OF THE INVENTION

1. Field of the Invention

The present invention relates to a pulley unit having a one-way clutch. This pulley unit can be provided in, for example, an auxiliary machine driven through a belt by a crank shaft of a vehicle engine. The auxiliary machine may include, for example, an alternator, air conditioner compressor, water pump, cooling fan of a vehicle and the like.

2. Description of the Related Art

Various auxiliary machines mounted on a vehicle engine are driven through a belt by a crank shaft of its engine. In case of an alternator, for example, which is one of the auxiliary machines, if it is coupled with an engine crank shaft so as to rotate synchronously therewith, power generation capacity of the alternator decreases if the rotation speed of the crank shaft drops.

Thus, the inventor of the present invention has considered that by incorporating a one-way clutch in the alternator, the rotation of a rotor of the alternator is kept the same by its inertia force if the rotation speed of the crank shaft drops, thereby improving power generation efficiency.

That is, a one-way clutch is disposed between a pulley and rotor of the alternator and the one-way clutch is changed between a locking state (driving power transmission state) and a free state (driving power transmission shut-down state) depending on a difference of rotation speed between the pulley and rotor so as to transmit the driving power or shut down transmission thereof between the pulley and rotor. To smooth a relative rotation of the pulley and rotor, and reduce the load, the rolling bearings are disposed on both sides of the one-way clutch.

According to the above conventional example, when the pulley is driven by a belt wound on an outer periphery thereof, a radial load from the belt is applied to the one-way clutch and rolling bearings on both sides. In this condition, by the a radial load from the aforementioned belt, the tightening distance between the pulley and outer wheel of the one-way clutch is increased so that the outer wheel of the one-way clutch becomes likely to be distorted. Consequently, the dimension in the diameter direction of the wedge-like spaces provided on several positions along the circumference of the one-way clutch is reduced so that the rollers are displaced to the free side. As a result, a wedge angle of the wedge-like space becomes likely to be reduced. If the wedge angle becomes smaller than its lower limit value, the roller of the one-way clutch remains locked but is not made free. That is, the proper functioning of the one-way clutch is lost.

Because usually, the belt is applied to a partial range of the pulley within a predetermined angle range of the circumference thereof, the aforementioned distortion of the outer wheel is not generated equally on the entire circumference but partially. Therefore, it can be considered that the aforementioned problem is induced by some of the plural rollers provided on the one-way clutch.

Although, according to the conventional art, the tightening distance between the pulley and one-way clutch or rolling bearing needs to be set large for the one-way clutch or rolling bearings on both sides not to slip out of the pulley in the axial direction due to a vibration, if the tightening distance is set larger than an appropriate one, the dimension in the diameter direction of the wedge-like space is reduced so that the wedge angle becomes small. Consequently, the proper functioning of the one-way clutch is lost. Therefore, according to the conventional art, a sufficient tightening distance between the pulley and one-way clutch cannot be ensured so as to prevent a slipout thereof.

SUMMARY OF THE INVENTION

Accordingly, a primary object of the present invention is to provide a pulley unit capable of stabilizing a long-term operation of a one-way clutch and rolling bearings.

The other objects, features and advantages of the present invention will be apparent from a following description.

To achieve the above object, in a pulley unit of the present invention, a one-way clutch is disposed at an intermediate range in the axial direction of an annular space between a pulley and a shaft body disposed coaxially with each other, and rolling bearings are disposed on both sides in the axial direction of the one-way clutch. A tightening distance for fitting between the one-way clutch and the pulley is set to be smaller than the tightening distance for fitting between the rolling bearing and the pulley.

Because the tightening distance between the one-way clutch and pulley is set to be smaller than that between the rolling bearings for supporting the pulley and pulley, in the pulley unit of the present invention, when the pulley is driven by a belt wound on an outer periphery thereof, even if an excessive radial load acts from the belt on the pulley, it comes that that radial load acts on not the one-way clutch, but on the rolling bearings on both sides in the axial direction thereof. Therefore, a disadvantage that a range corresponding to a clutch functioning portion of an outer wheel of the one-way clutch is distorted can be avoided so that a wedge angle of a wedge-like space of the one-way clutch is kept unchanged. As a result, the one-way clutch can be operated normally thereby improving the reliability of the pulley unit considerably.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DESCRIPTION OF THE PREFERRED EMBODIMENTS

Hereinafter, the preferred embodiments of the present invention will be described with reference to the accompanying drawings.

FIGS. 1–6 show a pulley unit 50A according to a first preferred embodiment of the present invention. This pulley unit 50A comprises a pulley 1 and a shaft body 2 disposed coaxially with each other, a one-way clutch 3 interposed in an annular space between the pulley 1 and shaft body 2 and rolling bearings 4, 4 disposed on both sides in the axial direction of the one-way clutch 3 in the annular space.

Figure 1:
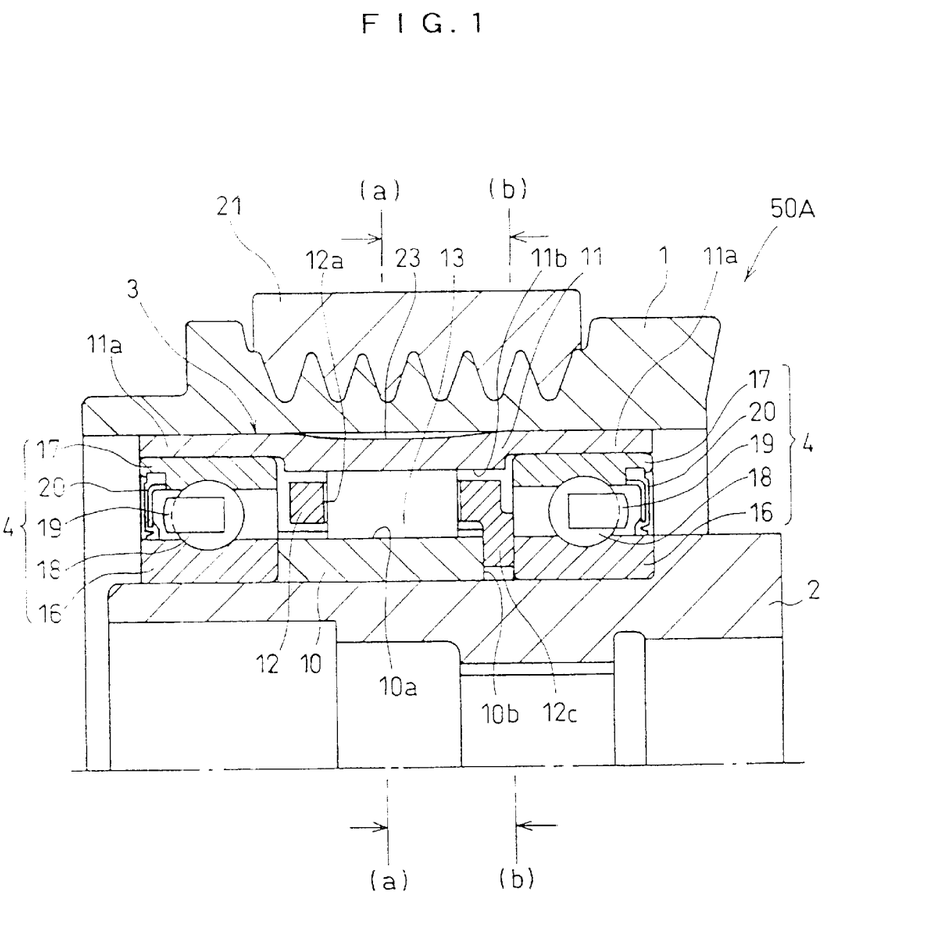
FIG. 1 is a longitudinal sectional view of a pulley unit according to a first preferred embodiment of the present invention.

The pulley 1 has wave-shaped grooves to which a belt is to be applied, on an outer periphery thereof. The pulley 1 is driven through the belt 21, for example, by a crank shaft of a vehicle. The shaft body 2 is a sleeve-like member and fixed to an input shaft (e.g., rotor of an alternator) of a vehicle auxiliary machine (not shown).

The one-way clutch 3 comprises an inner wheel (or inner ring) 10 containing flat key-shaped cam faces 10a provided at plural positions on an outer periphery thereof, an outer wheel (or outer ring) 11 having extending portions 11a, 11a for mounting rolling bearings 4, 4, provided on both ends in the axial direction, a holding device 12 having pockets 12a formed so as to pass through from inside to outside in the diameter direction corresponding to each of the cam faces 10a, a plurality of rollers 13 accommodated in each of the pockets 12a of the holding device 12, and coil springs 14 each having a substantially rectangular section, which are accommodated in each of the pockets 12a of the holding device 12 and press the roller 13 to a narrow side (lock side 22a) of a wedge-like space between the cam face 10a and an inner peripheral face 11b of the outer wheel 11. In this case, a wide side of the wedge-like space 22 is a free side 22b.

Figure 4:
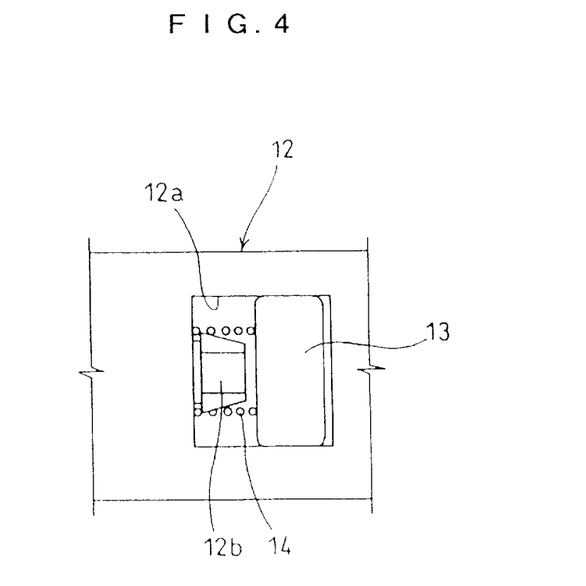
FIG. 4 is a plan development diagram showing a part of a one-way clutch.

On an inner wall face of the pocket 12a of the holding device 12 is formed a protrusion 12b the root portion of which is constricted, integrally therewith. An end in the axial direction of the coil spring 14 is engaged with this constricted portion at the root of the protrusion 12b. Then, an inner periphery of the coil spring 14 is supported by an outer periphery of the protrusion 12b so as to prevent the coil spring 14 from being distorted at the time of compression.

On an end in the axial direction of the inner wheel 10 of the one-way clutch 3 is provided a slit-like concave portion 10b which is open to the end of the shaft and open to outside and inside in the diameter direction. On an inner side of an end in the axial direction of the holding device 12 is provided a convex portion 12c which is engaged with the concave portion 10b from the axial direction. The holding device 12 is blocked from motion in the circumferential direction by pressure-fitting between the concave portion 10b and convex portion 12c. The convex portion 12c is nipped by a deep wall face of the concave portion 10b and an end face of an inner wheel 16 of one rolling bearing 4 disposed on an open end of the concave portion 10b from the axial direction. Thus, the movement of the holding device 12 to the axial direction is inhibited.

The two rolling bearings 4, 4 are general deep groove ball bearings having the inner wheel 16, outer wheel 17, a plurality of balls 18, and holding device 19. A sealing member 20 is mounted only on an outer end in the axial direction between the inner wheel 16 and outer wheel 17. An annular space in which the one-way clutch 3 and the rolling bearings 4, 4 are disposed is closed by these two sealing members 20.

Figure 5:
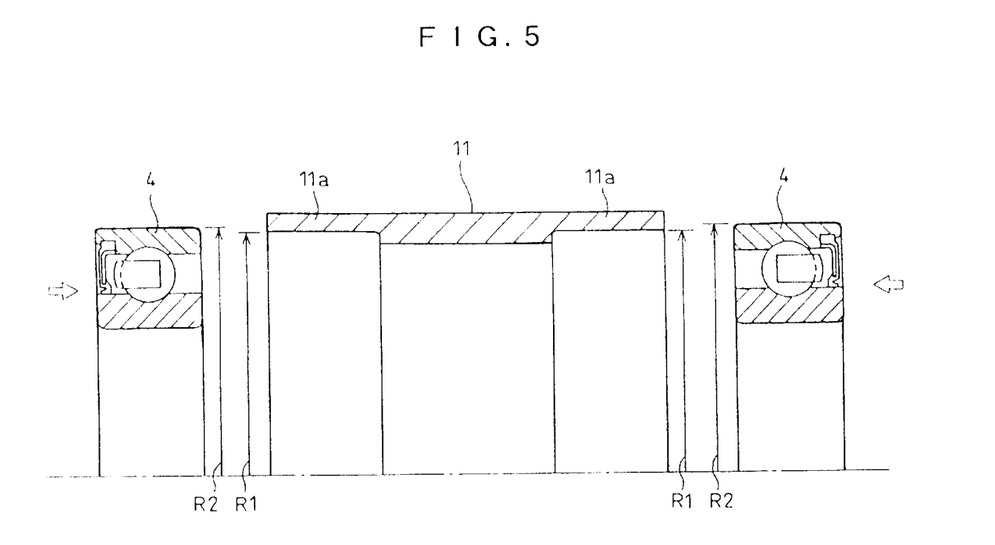
FIG. 5 is an explanatory view for explaining a fitting between an outer wheel of a one-way clutch and rolling bearings.
Figure 6:
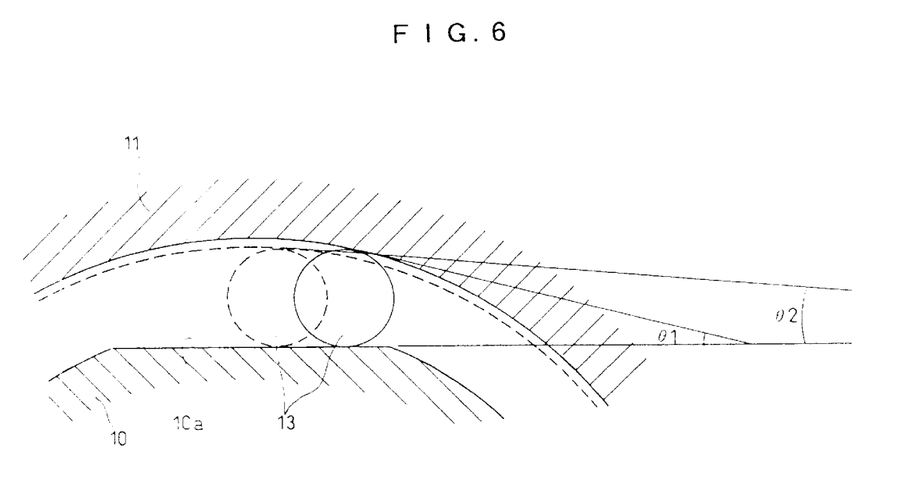
FIG. 6 is an explanatory view showing an unpreferred phenomenon of the one-way clutch.

In the outer wheel 11 of the one-way clutch 3, a tightening distance between an intermediate range excluding extending portions 11a, 11a on both ends of the outer wheel 11, which is a range corresponding to clutch functioning part and the pulley 1 is set to be smaller than the tightening distance between both the extending portions 11a, 11a and the pulley 1. To establish this relation, as shown in FIG. 5, an inside diameter R1, R1 of both the extending portions 11a, 11a of the outer wheel 11 is set to be smaller by a desired amount than an outside diameter R2, R2 of the rolling bearings 4, 4 and then the rolling bearings 4, 4 are pressed with respect to both the extending portions 11a, 11a. Consequently, the extending portions 11a, 11a are expanded outward in the diameter direction so that as shown in FIG. 1, a desired gap 23 is formed in the intermediate range in the diameter direction between the pulley 1 and outer wheel 1. Meanwhile, in FIG. 1, the gap 23 is represented exaggeratedly.

Figure 2:
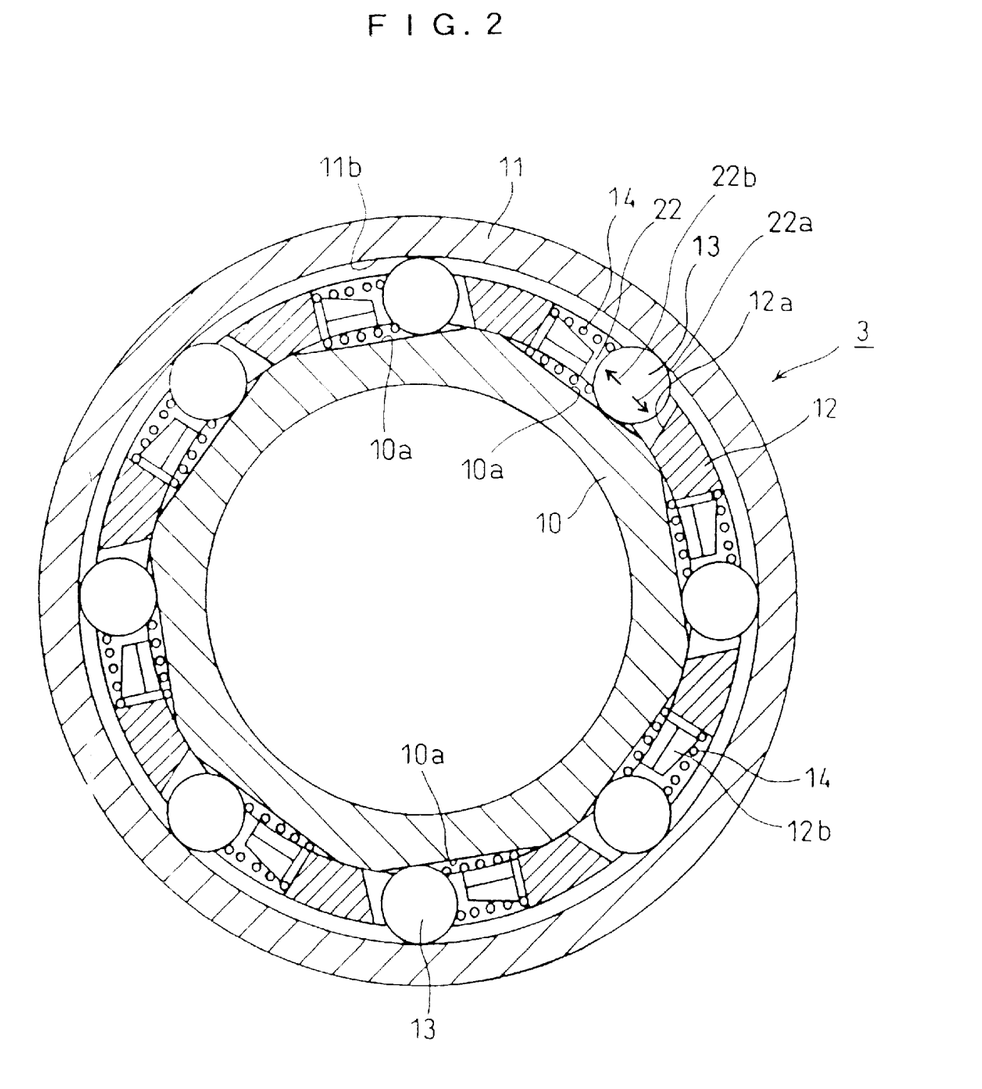
FIG. 2 is a sectional view taken along the line (a)—(a) of FIG. 1.
Figure 3:
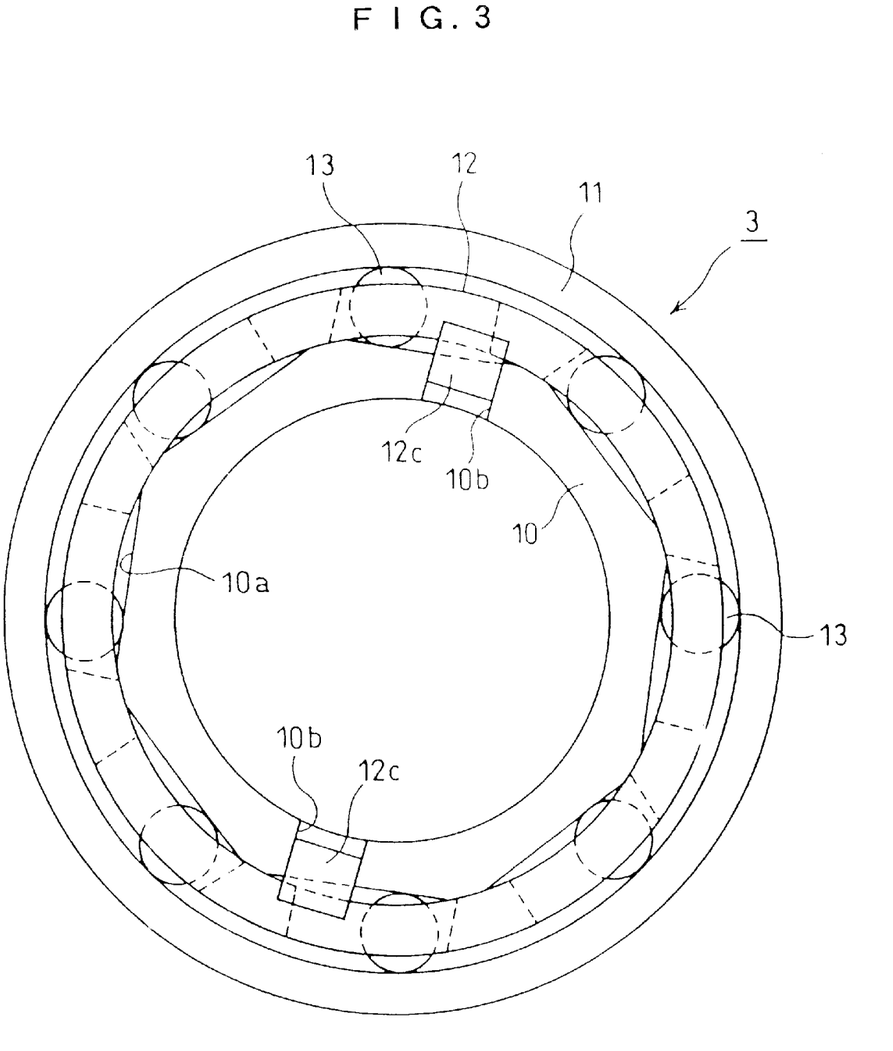
FIG. 3 is a sectional view taken along the line (b)—(b) of FIG. 1.

Next, an operation of the pulley unit 50A will be described. If the rotation speed of the pulley 1 becomes relatively faster than that of the shaft body 2, each of rollers 13 of the one-way clutch 3 is moved to a narrow side 22a of the wedge-like space 22 between the cam face 10a and the inner peripheral face 11b of the outer wheel 11 so that it is locked. By this lock, the pulley 1 and shaft body 2 are rotated integrally and synchronously with each other. If the rotation speed of the pulley 1 becomes relatively lower than that of the shaft body 2, the roller 13 of the one-way clutch 3 is moved to a wide side 22b of the wedge-like space 22 so that it becomes free. By this free state, transmission of rotation force from the pulley 1 to the shaft body 2 is interrupted so that the shaft body 2 continues to rotate by its inertia force.

In case when the pulley unit 50A is used for the alternator, it is possible to keep the rotation of a rotor of the alternator in a high range irrespective of changes of rotation of the crank shaft of an engine serving for a driving power source of the belt 21 so as to increase power generation efficiency. For this purpose, if the rotation speed of the crank shaft is increased, the one-way clutch 3 is brought into the aforementioned lock state so that the shaft body 2 and pulley 1 are rotated synchronously. If the rotation speed of the crank shaft is decreased, the one-way clutch 3 is brought into the free state and the shaft body 2 is kept to be rotating by its inertia force irrespective of deceleration of the pulley 1.

In this application style, the tension of the belt 21 is always applied to the pulley unit 50A, so that a radial load always acts on the pulley 1. In this case, because as described above, the tightening distance between the pulley 1 and one-way clutch 3 is set to be smaller than the tightening distance between the pulley 1 and rolling bearings 4, 4, the radial load from the belt 21 acts on not the one-way clutch 3 but the rolling bearings 4, 4 on both sides in the axial direction. Consequently, in the outer wheel 11 of the one-way clutch 3, the inner peripheral face 11b which is a range corresponding to the clutch functioning portion is never distorted inward in the diameter direction. As a result, a wedge angle of the wedge-like space 22 of the one-way clutch 3 is kept unchanged. Thus, the behavior of the roller 13 of the one-way clutch 3 upon lock or free operation can be stabilized so as to ensure a stable operation of the one-way clutch 3. In case when the tightening distance between the pulley 1 and one-way clutch 3 is set to be the same as the tightening distance between the pulley 1 and rolling bearings 4, 4, as shown by broken line of FIG. 6, the intermediate range in the axial direction of the outer wheel 11 of the one-way clutch 3 is distorted inward in the diameter direction by a radial load from the belt 21, so that the roller 13 is displaced to the aforementioned free side 22b. Consequently, the wedge angle of the wedge-like space 22 decreases from θ1 to θ2, so that the aforementioned problem of the conventional art is more likely to occur.

The present invention is not restricted to the first embodiment, but various applications and modifications which will be described later can be considered.

Figure 7:
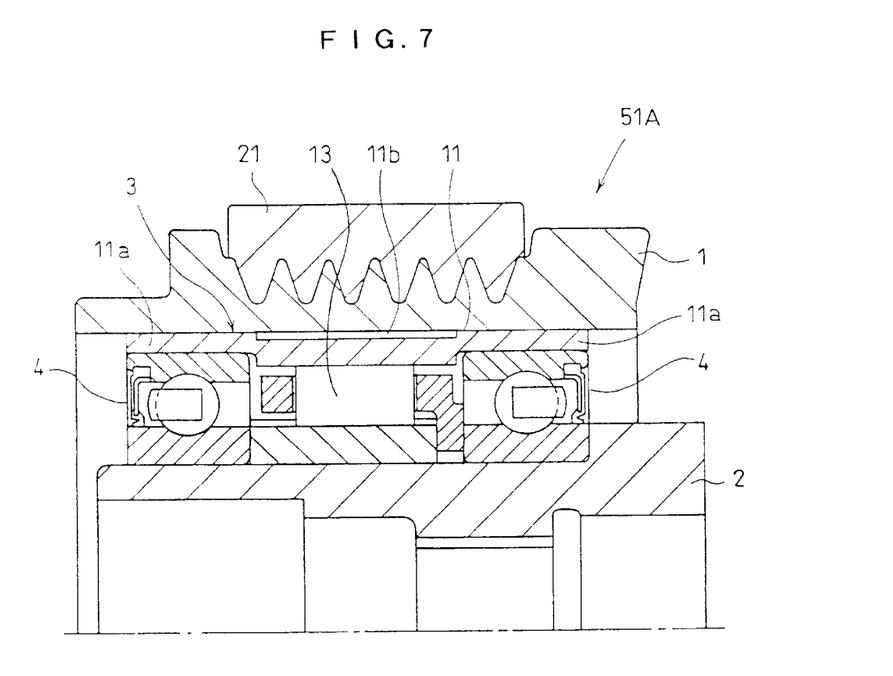
FIG. 7 is a longitudinal sectional view of a pulley unit according to a second preferred embodiment of the present invention.

In the pulley unit 51A according to a second preferred embodiment of the present invention shown in FIG. 7, a peripheral groove 11b forming a predetermined gap relative to the pulley 1 is provided in a range corresponding to the clutch functioning portion of the one-way clutch 3 or an intermediate range excluding the extending portions 11a, 11a provided on both ends, of an outer peripheral face of the outer wheel 11 of the one-way clutch 3.

Figure 8:
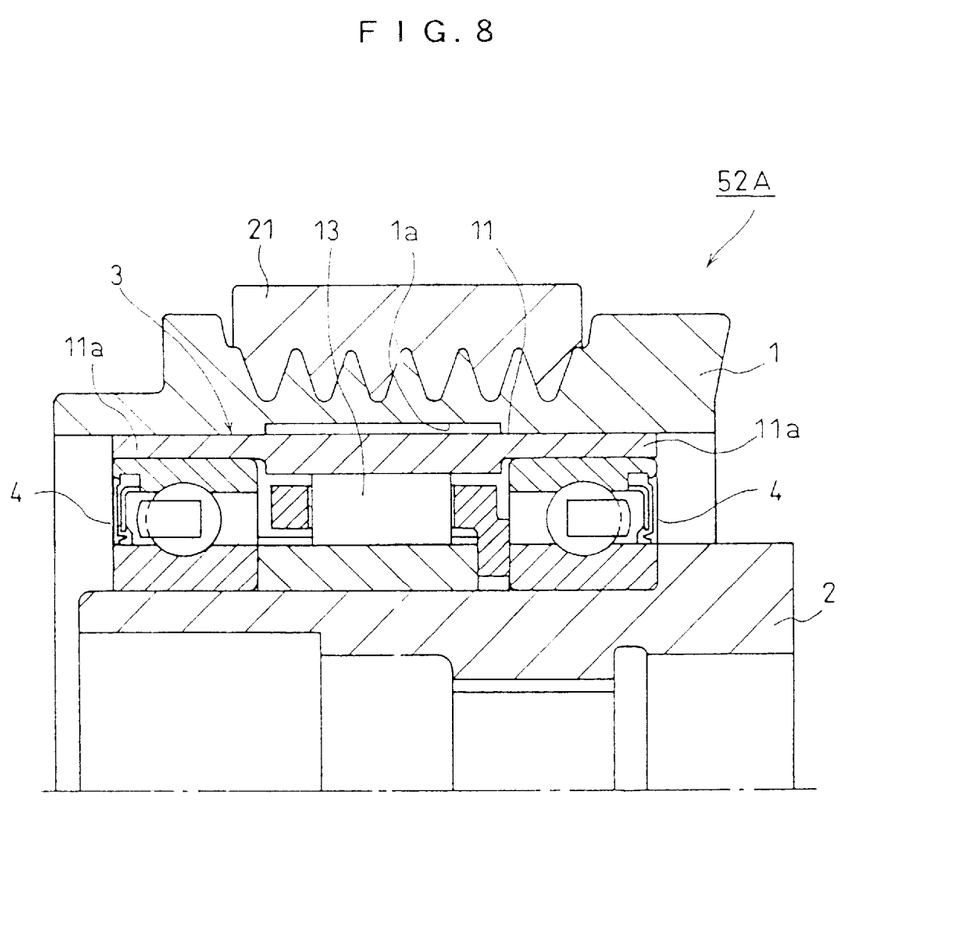
FIG. 8 is a longitudinal sectional view of a pulley unit according to a third preferred embodiment of the present invention.

In a pulley unit 52A according to a third preferred embodiment of the present invention shown in FIG. 8, a peripheral groove 1a forming a predetermined gap relative to the outer wheel 11 of the one-way clutch 3 is provided in a range corresponding to the clutch functioning portion of the one-way clutch 3 or an intermediate range excluding the extending portions 11a, 11a on both ends, of an inner face of the pulley 1. In the embodiments shown in FIGS. 7 and 8, like the first embodiment, it is possible to so construct that the radial load applied to the pulley 1 is borne not by the one-way clutch 3 but by the rolling bearings 4, 4 on both sides of the one-way clutch 3. Thus, stabilization of the function of the one-way clutch 3 can be ensured. According to these embodiments, no unreasonable stress is applied to any part.

Although in the above respective embodiments, the coil spring 14 is exemplified as an elastic member of the one-way clutch 3, various kinds of leaf springs or elastic pieces can substitute for it.

Although in the above respective embodiments, the cam faces 10a of the one-way clutch 3 are formed in the inner wheel, the present invention can be applied to an example in which they are formed in the outer wheel. However, the above embodiments are suitable for use in high speed rotations because the rollers can be prevented from slipping out of their locking positions by centrifugal force even in a high speed rotation range.

Although in the above respective embodiments, the outer wheel 11 of the one-way clutch 3 is provided with the extending portions 11a, 11a on both ends in the axial direction thereof such that the rolling bearings 4, 4 are fit to these extending portions 11a, 11a, the present invention can be applied to an example in which the outer wheel is not provided with the extending portions 11a, 11a such that the rolling bearings 4, 4 are directly fit to the pulley 1. In this example, by nipping the one-way clutch 3 by the rolling bearings 4, 4 fit by pressure, the one-way clutch 3 can be prevented from slipping out in the axial direction.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A pulley unit comprising:
a shaft body;
a pulley disposed on said shaft body coaxially therewith;
a one-way clutch disposed in an axially intermediate portion in an annular space between said pulley and shaft body, and having an outer ring having, on respective ends thereof, extending portions that extend axially from a range corresponding to a clutch functioning portion; and rolling bearings disposed between respective extending portions and said shaft body,
wherein, in said outer ring of said one-way clutch, a circumferential fitting interference between said range corresponding to said clutch functioning portion and said pulley is set to be smaller than that between said extending portions and said pulley.

2. A pulley unit as claimed in claim 1 wherein said one-way clutch includes:
an inner ring having cam faces provided on an outer peripheral face thereof,
said outer ring,
a holding device, mounted between said inner ring and outer ring, and having a plurality of pockets,
a plurality of rollers accommodated in each of the pockets of said holding device, and
coil springs for pressing each of said rollers toward a narrow side of a wedge-like space formed between the cam faces of said inner ring and the inner peripheral face in said intermediate range of said outer ring,
wherein said rollers are either (1) moved toward the narrow side of said wedge-like space so as to be brought into a locking state or (2) moved toward a wide side of said wedge-like space so as to be brought into a free state, depending on a relative speed between said pulley and said shaft body.

3. A pulley unit as claimed in claim 1 wherein:
an inside diameter of said extending portions is smaller than an outside diameter of said rolling bearings and
by pressing said rolling bearings with respect to said extending portions, the circumferential fitting interference for fitting between said range corresponding to said clutch functioning portion and said pulley is set to be smaller than that between said extending portions and said pulley.

4. A pulley unit as claimed in claim 1 wherein:
an inside diameter of said extending portions is set to be smaller than an outside diameter of said rolling bearings and
by pressing said rolling bearings with respect to said extending portions, said extending portions are expanded outward in the diameter direction so that a gap of a predetermined amount is formed between said pulley and the intermediate range in the axial direction of said outer ring.

5. A pulley unit comprising:
a shaft body;
a pulley disposed on said shaft body coaxially therewith;
a one-way clutch disposed in an axially intermediate portion in an annular space between said pulley and shaft body, and having an outer ring, said outer ring having, on respective ends thereof, extending portions that extend axially from a range corresponding to a clutch functioning portion; and
rolling bearings disposed between respective extending portions and said shaft body, wherein:
said extending portions are expanded outward in the diameter direction by pressure of said rolling bearings pressing outward with respect to said extending portions, and
a first circumferential fitting interference between said range corresponding to said clutch functioning portion and said pulley is set to be smaller than a second circumferential fitting interference between said extending portions and said pulley.

6. A pulley unit comprising:

a shaft body;

a pulley disposed on said shaft body coaxially therewith;

a one-way clutch disposed in an axially intermediate portion in an annular space between said pulley and shaft body, and having an outer ring having, on respective ends thereof, extending portions that extend axially from a range corresponding to a clutch functioning portion; and rolling bearings disposed between respective extending portions and said shaft body, wherein a peripheral groove forming a predetermined gap relative to the pulley is provided in an outer peripheral face of said outer ring of said one-way clutch in said range corresponding to said clutch functioning portion.

7. A pulley unit comprising:

a shaft body;

a pulley disposed on said shaft body coaxially therewith;

a one-way clutch disposed in an axial direction in an annular space between said pulley and shaft body, and having an outer ring having, on respective ends thereof, extending portions that extend axially from a range corresponding to a clutch functioning portion; and rolling bearings disposed between respective extending portions and said shaft body, wherein a peripheral groove forming a predetermined gap relative to said outer ring of said one-way clutch is provided in an inner peripheral face of said pulley in said range corresponding to said clutch functioning portion.

* * * * *